US011042953B1

(12) United States Patent
Delgado et al.

(10) Patent No.: US 11,042,953 B1
(45) Date of Patent: Jun. 22, 2021

(54) METHODS AND SYSTEMS FOR DETECTING ERRORS IN KIT ASSEMBLY

(71) Applicant: Shopify Inc., Ottawa (CA)

(72) Inventors: Bryon Leonel Delgado, Ottawa (CA); Daniel Beauchamp, Ottawa (CA); Brian Crowder, Lynchburg, VA (US)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 16/724,658

(22) Filed: Dec. 23, 2019

(51) Int. Cl.
*G06Q 50/28* (2012.01)
*G06T 7/00* (2017.01)
*G06F 30/20* (2020.01)
*G06T 19/00* (2011.01)
*G06F 113/20* (2020.01)

(52) U.S. Cl.
CPC ............. *G06Q 50/28* (2013.01); *G06F 30/20* (2020.01); *G06T 7/001* (2013.01); *G06T 7/0008* (2013.01); *G06T 19/006* (2013.01); *G06F 2113/20* (2020.01)

(58) Field of Classification Search
CPC ......... G06F 30/20; G01N 21/88; G06T 7/001; G06T 7/0008
See application file for complete search history.

(56) References Cited

U.S. PATENT DOCUMENTS

| 4,972,494 | A | * | 11/1990 | White | B65B 19/28 209/535 |
| 6,373,519 | B1 | * | 4/2002 | Sybert | B07C 5/12 348/86 |
| 10,467,507 | B1 | * | 11/2019 | Hao | G06K 9/66 |
| 2011/0075937 | A1 | * | 3/2011 | Tate | G06K 9/3275 382/218 |
| 2016/0343054 | A1 | * | 11/2016 | Chu | G06Q 30/0627 |
| 2018/0025487 | A1 | * | 1/2018 | Macdonald | B07C 5/342 348/91 |
| 2019/0295246 | A1 | * | 9/2019 | Smith | G06F 19/3462 |
| 2019/0347783 | A1 | * | 11/2019 | Salgian | G02B 27/017 |
| 2019/0362480 | A1 | * | 11/2019 | Diao | G06T 7/001 |

* cited by examiner

*Primary Examiner* — Todd Buttram
(74) *Attorney, Agent, or Firm* — Rowand LLP

(57) ABSTRACT

Methods and systems for packaging a product offering of product items associated with a merchant account. A product packaging model is associated with a kit of product items having a selected packaging option. During assembly, one or more images of the kit are captured and image features are detected and compared to parameters specified in the product packaging model. An error notification is output if a deviation is detected between the detected image features and the parameters prescribed by the product packaging model.

23 Claims, 10 Drawing Sheets

METHODS AND SYSTEMS FOR DETECTING ERRORS IN KIT ASSEMBLY

FIELD

The present disclosure relates to computer-implemented e-commerce platforms and, in particular, to methods and systems for detecting errors in kit assembly.

BACKGROUND

Over the past decade, online product retailing has become commonplace, to the point where a large percentage of merchants, whether big or small, make products available through an online store. In some cases, merchants may use a third party e-commerce platform that provides a centralized system to enable online resources and facilities for managing retail business. Part of that model includes having fulfilment partners that perform the fulfillment phase of picking-and-packing product items and shipping them to a consumer in response to an order completed through the e-commerce system.

Some merchants occasionally wish to package two or more of their product items to offer them as a packaged offering or "kit". The kit is a unitary product and often has specific packaging or product arrangement or labelling associated with it. Unfortunately, fulfillment partners may incorrectly assemble kits, resulting in dissatisfied customers, returns, and extra shipping costs. Many resources may be consumed, including time and messaging resources, in pre-arranging the design of a kit that can be properly assembled by a fulfillment partner.

BRIEF DESCRIPTION OF THE DRAWINGS

Embodiments will be described, by way of example only, with reference to the accompanying figures wherein.

DETAILED DESCRIPTION

Figure 1:
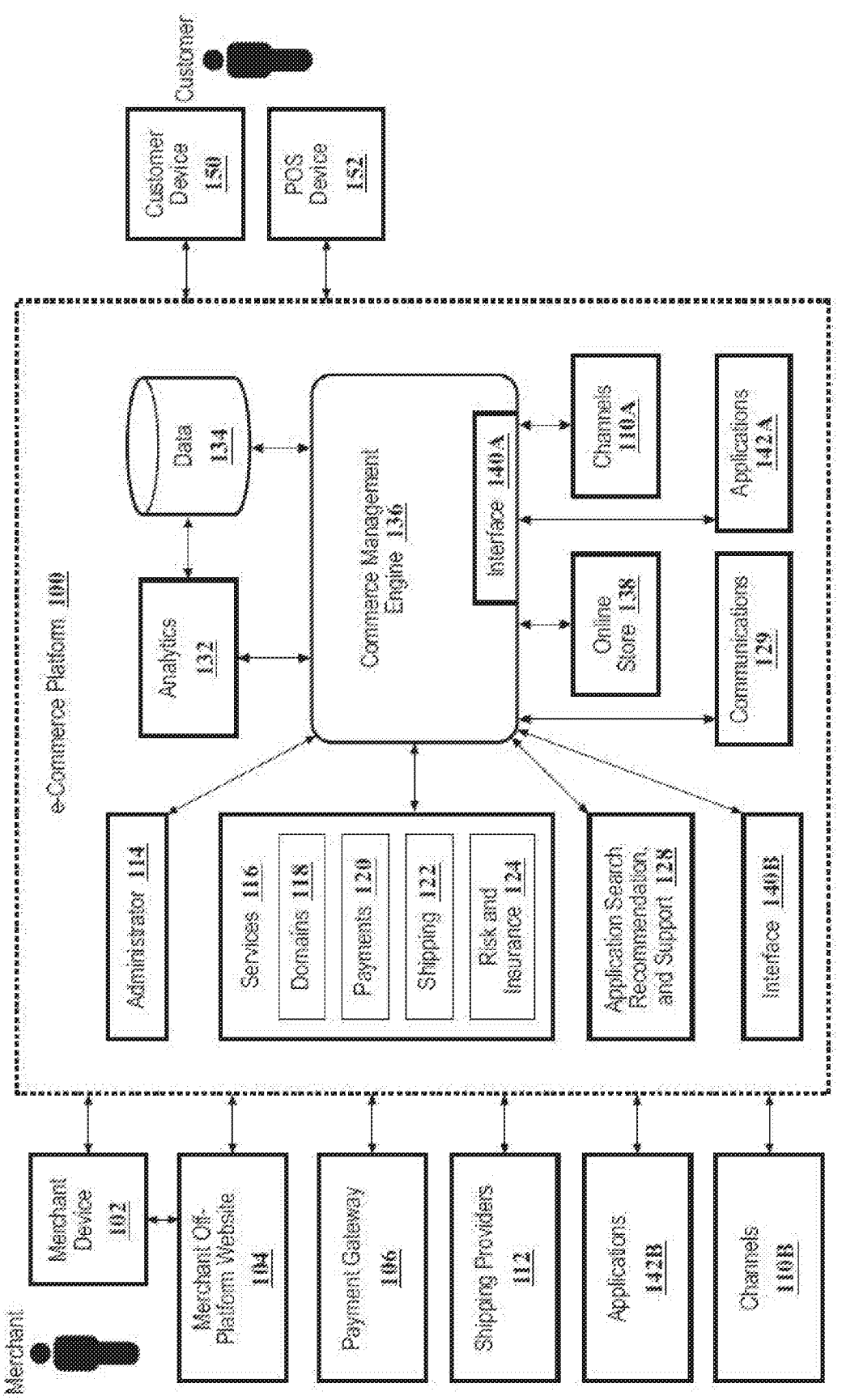
FIG. 1 is a block diagram of an e-commerce platform, according to one embodiment.

In one aspect, the present application describes a computer-implemented method for generating a model for a product offering of a set of product items associated with a merchant account. The method may include detecting a trigger event to create the model; automatically selecting two or more product items, from among a plurality of product items associated with the merchant account, that are to be included in the product offering; retrieving, from memory, model data for the two or more product items and packaging parameters; filtering the packaging parameters based on the model data for the two or more product items to produce filtered packaging options; selecting a packaging option from among the filtered packaging options; generating a product packaging model based on the model data for the two or more product items and based on the selected packaging option; and transmitting the product packaging model to a device associated with the merchant account.

In some implementations, the method may include receiving an approval message relating to the product packaging model from the merchant account and, in response, storing in memory the product packaging model in association with the merchant account for use in order fulfillment relating to the product offering.

In some implementations, the trigger event may include one of: receipt of a merchant request, a date, a time elapsed since a prior event, inventory levels, sales data, a product launch, or a sales metric associated with the merchant exceeding a trigger value.

In some implementations, automatically selecting may include retrieving sales-related parameters for the plurality of product items from memory and identifying the two or more product items based on the sales-related parameters. In some cases, identifying includes identifying at least two products having a same-sale correlation.

In some implementations, automatically selecting may include selecting a new product item based on a product launch date and selecting an existing product item based on sales data associated with that existing product item.

In some implementations, the model data may include dimensional data for each of the two or more products items. In some cases, filtering may include determining a packaging arrangement of the two or more product items based on the dimensional data for the two or more product items, identifying minimum container dimensions based on the packaging arrangement, and filtering the packaging options based on the minimum container dimensions. In some cases, the packaging parameters include dimensions for packaging options. In some cases, generating the product packaging model may include determining a packaging arrangement and orientation for the two or more product items based, in part, on the dimensional data for each of the two or more product items and the dimensions of the selected packaging option.

In some implementations, generating may include generating a 3D model based on the model data for the two or more product items and the packaging parameters for the selected packaging option.

In another aspect, the present application describes a system for generating a model for a product offering of a set of product items associated with a merchant account. The system may include a database storing data for a plurality of product items associated with the merchant account, including model data for each of the product items, and storing packaging parameters, a processor, and a memory storing computer-executable instructions that, when executed by the processor, are to cause the processor to carry out one or more of the methods described herein.

In yet a further aspect, the present application describes a non-transitory computer-readable medium storing processor-executable instructions that, when executed by one or more processors, are to cause the one or more processors to carry out one or more of the methods described herein.

For illustrative purposes, specific example embodiments will now be explained in greater detail below in conjunction with the figures.

Example e-Commerce Platform

In some embodiments, the methods disclosed herein may be performed on or in association with an e-commerce platform. Therefore, an example of an e-commerce platform will be described.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers (or "purchasers") as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
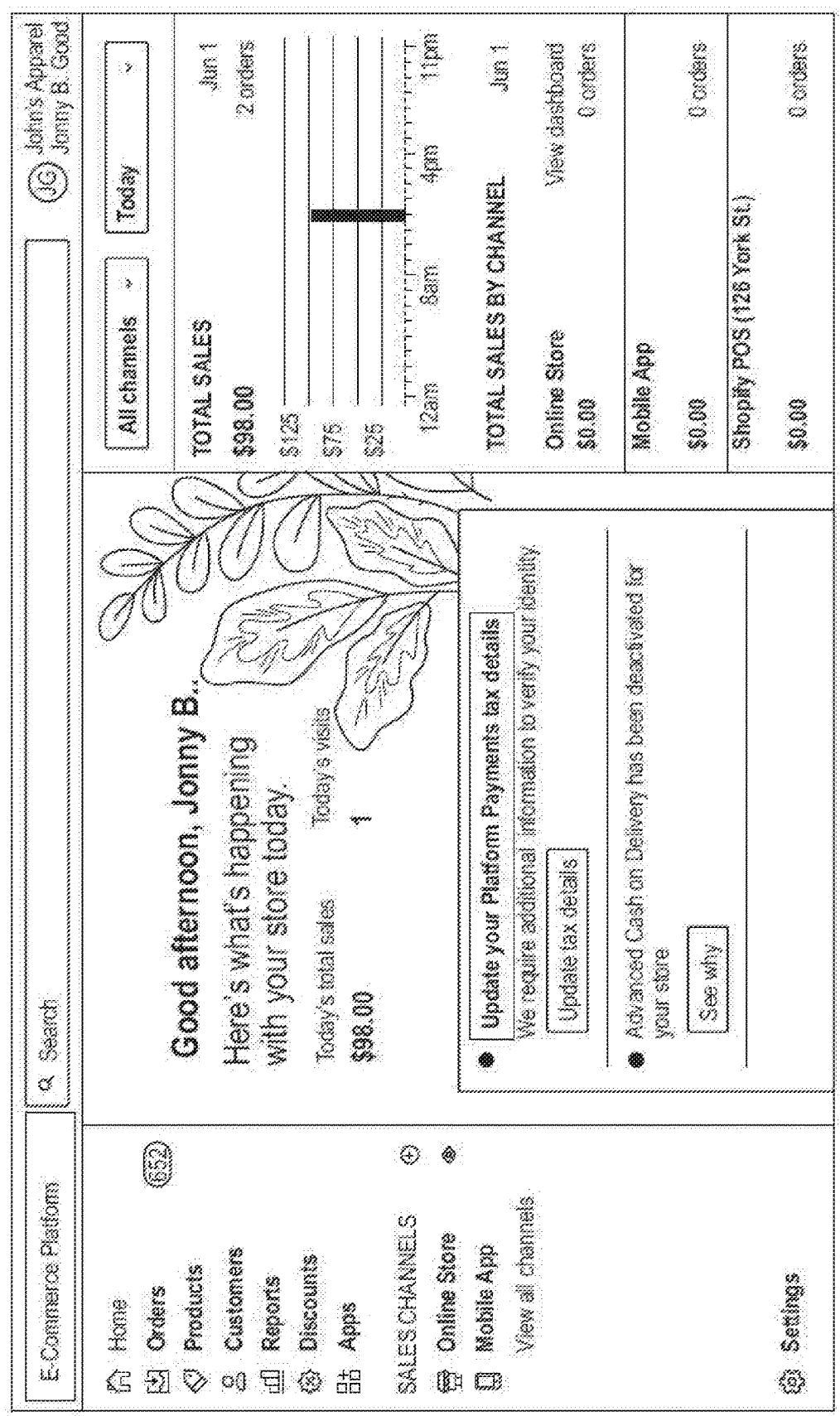
FIG. 2 is an example of a home page of an administrator, according to one embodiment.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for the communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a platform payment facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The platform payment facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharing) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for the platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through an application search, recommendations, and support platform 128 or system. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide the application search, recommendation and support platform 128. The application search, recommendation and support platform 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Product Packaging

Many merchants offer a large set of products for purchase. Even with one item, for example a t-shirt or a bottled sauce, there may be a number of variations, for example different sizes, colours, flavours, etc. Each variation of an item may be a separate "product", e.g. may have its own SKU, and may be referred to as a product variant.

Many merchants using an e-commerce platform may have fulfillment carried out by a fulfillment partner. The fulfillment partner may handle pick-and-pack functions, where they warehouse products for the merchant (and likely other merchants) and retrieve, package, and ship products based on orders from the e-commerce platform. In many cases, the fulfillment partner selects a shipping carton or package from the ones that it has available that are suitable for containing and shipping the ordered product or products.

In some situations, a merchant may offer a packaged set of products that includes two or more of their current products or product variants. This may be referred to as a "kit", and the terms "packaged set of products", "product collective", "product offering", and "kit" may be used interchangeably in this description. The kit itself is a "product", i.e. it is ordered as a unitary item and it has its own SKU. The kit may be assembled in order to package together two or more complementary items in some cases. For example, a kit may be created to contain three bottles of sauce in three different flavours. In another example, a kit may contain related but different items, for instance a "grooming kit" containing a razor, razor blades, deodorant, and shaving cream.

It will be appreciated that a packaged set of products, or kit, is distinct from a multi-product order. In a multi-product order, the products may be packaged in any suitable shipping container, together with loose fill (e.g. packing paper, packing peanuts, etc.), and indeed may be shipped separately. The packaging is incidental to the order. Conversely, in the case of a packaged set of products or a kit, the collective items and their packaging are the "product". The packaging may be custom designed to display the products within the kit in some cases. The packaging may include specific branding or labelling. The packaging may include inserts or other additional materials within the kit.

Currently, a merchant may create a kit outside of the e-commerce platform and fulfillment system by picking, packaging, and labelling the kit on their own. They may then provide the kit to the fulfillment partner as a unitary "product". However, this lacks flexibility to customize kits to contain different varieties of the products or to adapt a kit or customize a kit, and may alter the consistency and efficiency in the product work-flow. It may be preferable to have the fulfillment partner assemble kits from the available products. In many cases, the merchant is unaware of the packaging options available to the fulfillment partner and their benefits or drawbacks, such as size, weight, shipping cost, but the merchant may still need to have decision-making control over the final packaged product. In some cases, a merchant may also have a poor understanding of how to advantageously group its products when it has hundreds or thousands of products. Accordingly, creation of a kit may involve a series of coordinated communications between at least a merchant and a fulfillment partner, and potentially also an e-commerce platform representative or a third-party app developer. The process may be lengthy and time-consuming to ensure that the kit produced by a fulfillment partner meets merchant expectations.

It would be advantageous to improve the generation of kits, particularly using the e-commerce platform in a manner that streamlines the process to reduce the time involved, the number of exchanged communications, and/or the possibility of errors.

In accordance with one aspect, the present disclosure provides for an e-commerce platform and method that involves generating a product packaging model. The product packaging model is a computer-generated representation of the kit, including the packaging and its contents, i.e. the two or more products within the packaging. The product packaging model may further include packaging material, such as fill.

The product packaging model may be based on polygonal modeling in the form of a mesh in some cases. The model may be a point cloud model in some cases. The model may be based on curve modeling. Other techniques for three-dimensional computer modeling may also be used. Any one of a range of 3D file formats may be used to store the product packaging model. Display of a view of the product packaging model includes projecting the model to produce a resultant raster-scan image of the view.

Generation of a product packaging model that includes the two or more products within the kit and its packaging details enables transmission of a kit design to a merchant device for fast display, manipulation, and, if needed, modification. Moreover, the three-dimensional computer modeling of both the product items within the kit and the packaging parameters enables automated optimization of the packaging arrangement, within any imposed constraints. It also reduces the communication between merchant and fulfillment partner, reduces the likelihood of error in kit generation, and improves the ability to do automated error or deviation detection and notification during the fulfillment phase.

Generation of a product packaging model may be based on detection by the e-commerce platform of a trigger event. In some cases, the trigger event may include receipt of an instruction, such as from a merchant device or from an administrator device. In some other cases, the trigger event may include detecting a condition. Example conditions may include detecting a new product item added to a merchant account, sales metrics over a period of time with respect to one or more product items associated with the merchant account, date or time-related triggers, inventory level of one or more products exceeding a threshold measure, or other parameters or conditions to which the e-commerce platform has access.

The generation of the product packaging model may include selecting two or more products from the set of products associated with a particular merchant. The selection may be automated in some embodiments. Various factors may be used in determining which product items to include in a kit. In some cases, those factors may include sales history data for the set of products. In one implementation, the selection may identify two or more items that have a history of being purchased together, i.e. that have a same-sale or same-order correlation. In another example, the selection may identify items based on a respective sales history indicator e.g. identifying the items as best or high-selling items or as low-selling items. In yet another example implementation, the selection may identify two items having a same-sale correlation and add a third item having a correlation in usage to at least one of the two items. In a further example implementation, a low-selling item with high inventory may be paired with one or more high-selling items in order to clear inventory of the less popular item.

In some cases, the factors may include time-related factors, such as combining a newly-introduced product item with one or more complementary items. In this case, the selection may be based on a launch date for a new product item or detection that a new product item was added to a merchant's store. As an example, a newly-introduced flavour of sauce may be combined with one or more existing sauce flavours. In some examples, the existing sauce flavours may be selected based on the fact that they are already the merchant's most commonly purchased flavours. In some cases, the time-related factors may include the length of time from the previous kit creation suggestion.

In some cases, the factors may also include product data, including dimensional data, shipping restrictions, and the like. For example, the selection may filter out products that would be difficult to co-package based on the product size or shipping requirements. In some cases, a breakable item may have particular shipping and packaging requirements that make it unsuitable for inclusion in a kit. In some cases, product items like foodstuffs may be unsuitable for inclusion in a kit, perhaps due to delivery or shipping restrictions or packaging restrictions. Other product data may be used to exclude certain products from selection.

In some examples, the product data may be used as the basis for selection as opposed to the basis for excluding products. For example, product items falling in the same category or class may be selected because they share a common category or class. As an illustrative example, the selected product items may include a shampoo, conditioner, and hair oil all falling within a merchant's "hair product" category. As another example, the selected product items may include three varieties of coffee beans.

The e-commerce platform stores model data for a set of products. The model data for a product may include dimensional data for the product. In some implementations the model data is stored in a 3D-model file format (e.g., GLTF, GLB, USDZ, STL, OBJ, FBX, COLLADA, 3DS, IGES, STEP, and VRML/X3D) that can be read and rendered to a suitable display device via common 3D software such as Autodesk™, CAD™, SOLIDWORKS™, and so on. In some implementations, the model data may include dimensional parameters, rather than a computer model. In some implementations, the model data may include product images which are stored in a suitable file format such as JPG, PNG, or WEBP.

The model data may be uploaded to the e-commerce platform from a merchant device, in some cases. For example, when a merchant account adds a new product, the graphical user interface presented on the merchant device for the new product may prompt the merchant account to provide product information, such as weight, size, and/or dimensional data. In some cases, the interface may prompt the merchant to provide images of the product. In some cases, the interface may present or propose one or more 3D models of the product for selection by the merchant. In some cases, the interface may permit the merchant device to upload a set of images of the product from which, together with dimensional data or other product information, the e-commerce platform may generate or build a 3D model of the product for storage as the model data.

The e-commerce platform further stores, or has access to, packaging parameters. The packaging parameters may include dimensional data for various packaging options, e.g. containers, cartons, boxes, bags, or other package formats. The packaging parameters may, in some implementations, include 3D-models for each packaging option. In some cases, each packaging option has specified dimensions, weight restrictions, fill types, and other such details. In some cases, the packaging parameters may include image data for various packaging options. In some cases, the image data may be combined with dimensional data to generate a 3D model of a packaging option.

The packaging parameters may be specific to a fulfillment, e.g. an engine or platform configured to process merchant orders. For example, a merchant account may be associated with one or more fulfillment centers (or platforms) configured to process orders relating to that merchant account. A specific fulfillment center may have a specific subset of packaging options available to it, and the e-commerce platform may have a record of packaging options associated with each fulfillment center. Accordingly, when the e-commerce platform retrieves packaging parameters, it may do so based on the fulfillment center associated with the merchant account and the specific set of packing options associated with that fulfillment center.

The e-commerce platform may be configured to filter and/or select a packaging option from the set of packaging parameters. In one example, the packaging parameters may be filtered based on the model data for the selected products. For instance, the model data, by virtue of the combined size or weight of the selected products, may render certain packages unworkable because they are too small or insufficiently sturdy.

The remaining options after filtering may be transmitted to an external device, like the merchant device, to enable selection of a preferred option in some cases. In some instances, the e-commerce platform selects a packaging option automatically. For example, the e-commerce platform may select an optimal packaging option from among the filtered options. In this sense, "optimal" may include solving an optimization expression that aims to identify or determine the packaging option having the smallest volume that is able to contain the selected products. In some cases, the optimization expression may have additional or different constraints. For example, certain product may have associated shipping restrictions, such as a minimum fill or padding depth, etc. In some cases, the optimization expression may be subject to certain constraints regarding arrangement of the products. For example, the kit may be configured to display the products right side up with labels facing out for aesthetic purposes, which constraint necessitates a larger package than would otherwise be required if the products could be packed in any configuration.

Once the e-commerce platform has a selected packaging option, the e-commerce platform generates the product packaging model from the packaging parameter and the model data. This include generating a three-dimensional model of the packaged items including the selected packaging option. The 3D model may be in any suitable file format for display on a merchant device (e.g., GLTF, GLB, USDZ, STL, OBJ, FBX, COLLADA, 3DS, IGES, STEP, or VRML/X3D). Once the product packaging model is generated it is sent or made available to a merchant device. Thus, the merchant device may display the product packaging model in a graphical user interface to visually present the kit to a merchant. The merchant device may be configured to allow user (merchant) manipulations of the product packaging model, e.g. to enable the merchant to rotate, open, close, and otherwise examine the model of the kit. Images within the model data and the packaging parameters may be used in building the product packaging model so as to result in a displayed kit that visually maps to the actual proposed kit, thereby enabling the merchant to evaluate and, if needed, make changes to the proposed kit.

As will be discussed further below, the product packaging model further enables detection of deviations from the proposed kit during the fulfillment phase, and generation of suitable notifications regarding any deviation.

Over time, the e-commerce platform may track sales data associated with a product offering of a kit having an associated product packaging model. If the sales data or another metric, such as an inventory level, falls below a threshold level, it may trigger a re-creation of the kit and its associated product packaging model. That is, the system may automatically generate a revised or modified kit by suggesting, for example, changing one or more of the product items in the kit and generating or building a new corresponding product packaging model.

Figure 3:
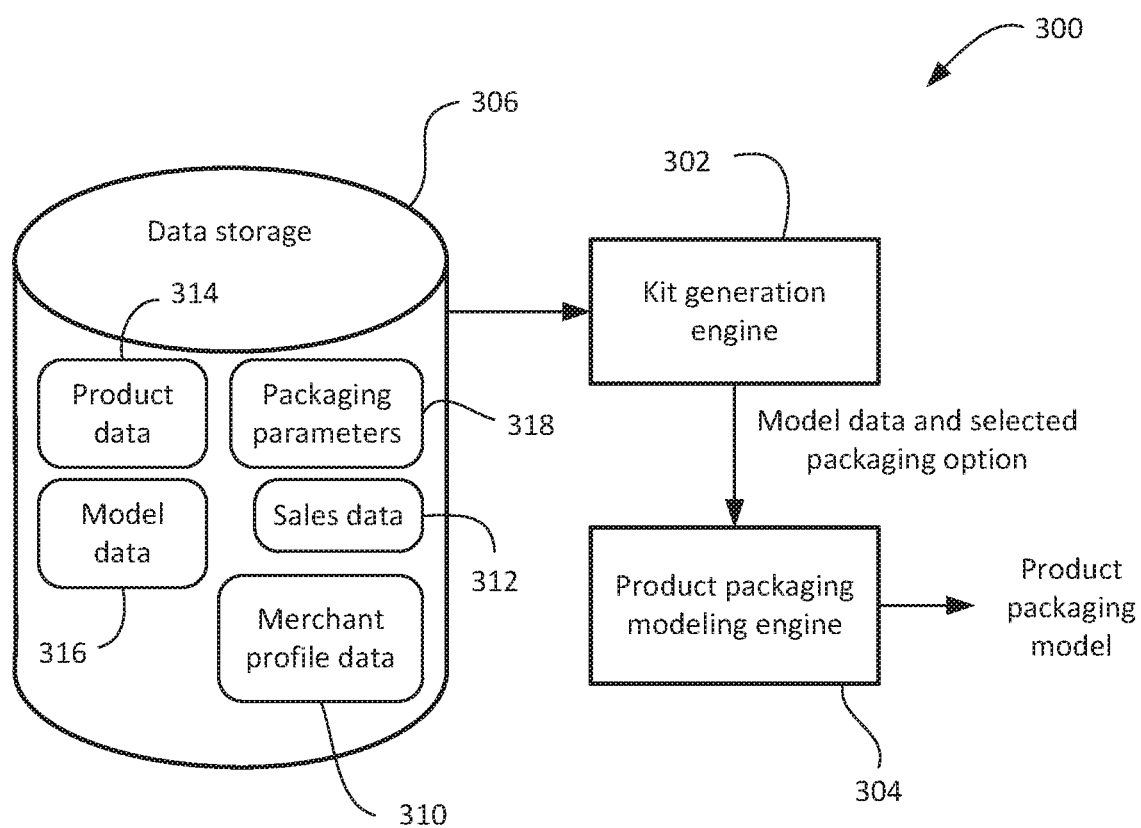
FIG. 3 diagrammatically illustrates a portion of an example e-commerce platform for generating product packaging models.

Reference will first be made to FIG. 3, which diagrammatically illustrates a portion of an example e-commerce platform 300 for generating product packaging models. The e-commerce platform 300 includes a kit generation engine 302 and a product packaging modeling engine 304. The kit generation engine 302 may be implemented using computer-readable instructions stored in memory and executable by one or more processors. The kit generation engine 302 may be configured to run as one of the services 116 (FIG. 1) offered by the platform 300, as one of the applications 142A (FIG. 1), or as one of the applications 142B (FIG. 1) in some cases. Similarly, the product packaging modeling engine 304 may be implemented using computer-readable instructions stored in memory and executable by one or more processors. The product packaging modeling engine 304 may be configured to run as one of the services 116, as one of the applications 142A, or as one of the applications 142B in some cases.

The platform 300 further includes data storage 306. The data storage 306 may include one or more databases or other data repositories. The data storage 306 may be local to the platform 300, stored and accessible remotely, or both. The data storage 306 includes merchant profile data 310, sales data 312, product data 314, product model data 316, and packaging parameters 318. The merchant profile data 310 includes information regarding individual merchant accounts, including any specified preferences and associations. For example, the merchant profile data 310 may indicate one or more associated fulfillment partners configured to process order data for the merchant.

The sales data 312 may include historical sales metrics for individual products for a specific merchant or across multiple merchants. In some cases, the sales metrics may be for product classes or categories. The sales data 312 may include data regarding correlations between product sales, e.g. same-sale metrics, and may include historical trend data regarding product sales.

The product data 314 may include information regarding individual product items and/or categories. For example, product data 314 may specify certain packaging and/or shipping requirements for a given product item. Product data 314 may be generic to a product item irrespective of the merchant offering the product, or may be specifically associated with the product item as offered by a specific merchant. For example, the product data 314 may include data regarding the product release date, historical or prospective, for a given merchant. In some cases, the merchant-specific information may include prescribed discount restrictions.

The product model data 316 includes information regarding the dimensions of the products. The product model data 316 may be grouped or stored by merchant account, in some cases. It may include specified dimensions and weight. It may include wireframe or mesh 3D model data for a product. The product model data 316 may include one or more images. The images may include an image of a label, an image of the product, an image of the product from different angles. The product model data 316 may include depth map data for a product.

The packaging parameters 318 may include dimension data for various packaging options. The dimension data may include exterior and interior dimensional data. The packaging parameters 318 may include fill types or fill restrictions, weight restrictions, e.g. a maximum weight, labelling options, shipping cost information, etc. The packaging parameters 318 may include associations between packaging options and fulfillment centers, e.g. indicating which fulfillment centers offer a particular packaging option.

The packaging parameters 318 may further include modeling data, such as images and/or 3D model data for the packaging.

The kit generation engine 302 is configured to detect a trigger event to create a product offering, e.g. a kit, for a particular merchant account. In one example, the trigger event is receipt of a command or message requesting creation of the product offering. For example, a merchant account interface on a merchant device may include a menu option or icon relating to product offering creation, e.g. create-a-kit. Selection of such an option may result in transmission of the command or message to the kit generation engine 302 on the platform 300. In some cases, the trigger event is not initiated by the merchant or an administrator but rather is based on a detected condition.

The kit generation engine 302 is further configured to obtain the set of products offered by the merchant from the data storage 306, which may be contained in the merchant profile data 310 or the product data 314. The kit generation engine 302 selects two or more products to form the new product offering, e.g. the kit. The selection may be based on selection of one or more products by the merchant account, or may be automated. If automated, the kit generation engine 302 may take into account a number of factors to select two or more product items. In some cases, the kit generation engine 302 includes, or has access to, a machine learning engine configured to identify and select two or more product items for a kit. Among the factors that may influence selection of the product items is the sales data 312 regarding individual items or product categories.

The kit generation engine 302 may further retrieve the model data 316 for selected products and packaging parameters 318. The packaging parameters 318 may be filtered based on the model data 316 to product filtered packaging options that may be suitable for the combination of products. A packaging option may be selected from among the filtered packaging options. As noted above, an optimization expression may be solved by the kit generation engine 302 to select a packaging option in some cases. The model data 316 may, in combination, result in one or more minimum dimensions and a collective weight of the two or more products. The minimum dimensions and collective weight may serve as the basis for filtering the packaging parameters to identify the filtered packaging options. In one implementation, the filtered packaging options may be transmitted to a merchant device for display and to receive a selection. In another implementation, the kit generation engine 302 selects a packaging option based on best fit (e.g. a packaging option with the smallest volume sufficient to contain the selected products) and subject to any prescribed constraints associated with any of the products in the kit or prescribed criteria set by the merchant account for the kit. For example, the merchant account may prescribe certain types or form factors for packaging, and the kit generation engine 302 may filter the packaging parameters to include only prescribed form factors and may select a packaging option from those form factors based on a best fit to the minimum dimensions and weight of the two or more products.

The kit generation engine 302 may further include selecting a fill type and/or quantity, label type and placement, and product insert design and placement. Any of these may be automated, may be prescribed by pre-set criteria associated with the merchant account, or may be configurable options presented on a merchant device via a suitable interface. That is, the merchant interface may solicit merchant selection of a fill type/quantity, label design and placement, and/or insert design and placement.

Having selected the packaging option and the two or more products, the kit generation engine 302 may pass the associated model data 316 and packaging parameters 318 to the product packaging modeling engine 304. The product packaging modeling engine 304 is configured to generate a 3D model of the assembled packaged product containing the two or more products within the selected packaging option. The engine 304 outputs the product packaging model, which may then be stored on the e-commerce platform 300, transmitted to a merchant device for display and review, and/or transmitted to a fulfillment partner device.

Figure 4:
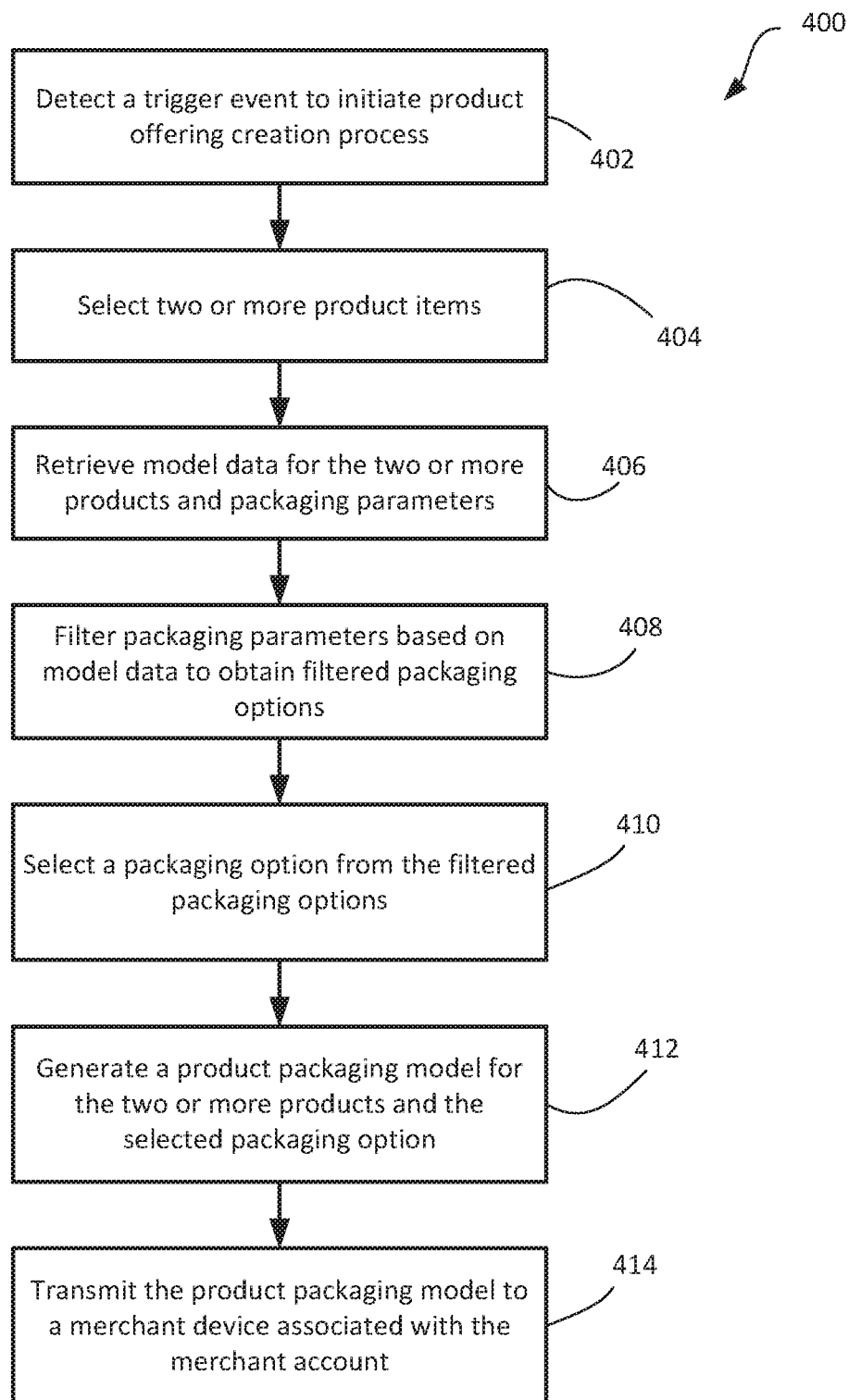
FIG. 4 shows, in flowchart form, an example method of generating a product packaging model in an e-commerce system.

Reference is now made to FIG. 4, which shows, in flowchart form, an example method 400 of generating a product packaging model in an e-commerce system. The method 400 may be implemented, wholly or partly, by an e-commerce platform, including one or more servers having processing units and associated memory storing processor-executable instructions.

The method 400 starts with detecting a trigger event in operation 402. In one example, the trigger event is receipt of a command from a merchant device. In another example, the trigger event is detection of a condition. The condition may be based on a date or season. For example, the platform may be configured to generate a proposed product packaging model at a particular date, at some date prior to a known sale period, like Black Friday or New Year's Day.

The condition may be based on a measure of time. For example, the platform may be configured to generate a proposed product packaging model based on time elapsed since the last proposed product packaging model generated for a particular merchant. The threshold for triggering the creation of a new proposed product packaging model may be 3 months, 6 months, or some other time period.

The condition may be based on sales data, inventory levels, or a combination thereof. For example, the platform may be configured to detect that inventory levels for a specific product or group of products have exceeded a threshold, or have exceeded a threshold for more than a predetermined length of time. As another example, the platform may detect that sales have fallen below a threshold for a merchant, for a product class for that merchant, or for a specific product item for that merchant. Other sales metrics and inventory data may be used as the basis for triggering the creation of a product packaging model.

In yet another implementation, the condition may relate to an existing kit for which a product packaging model was previously generated. For example, the trigger event may include detection that sales of an existing kit have fallen below a threshold level, or that the existing kit has hit a pre-set "expiry" date. In some cases, the trigger may include detection of a change in product availability with regard to the merchant. For example, a particular product item may be scheduled to be discontinued as an offering. Accordingly, if an existing kit contains that particular product item, the platform may detect the impact on the existing kit and trigger a new product packaging model generation process. In these circumstances, the method 400 may be adaptive to involve modifying an existing kit and its associated product packaging model, as opposed to generating a new kit. In the operations that follow, it will be understood that suitable modifications or constraints may be imposed to adapt the operations to modification of an existing kit instead of building of a new kit.

Once the platform has determined, in operation 402, that a trigger event has been detected, then it proceeds to generate the product packaging model. The trigger event relates to a specific merchant account. The method 400 includes, in operation 404, selecting two or more product items from the set of product items offered by that merchant account. In some cases, the selecting is partly based on the trigger event. As an example, if the trigger event relates to new release of a product item, low sales of a product item, high sales of a product item, high inventory levels of a product item, or the like, then that product item relevant to the trigger event may be included as one of the selected product items for the proposed kit.

Selecting may be partly or wholly based on merchant selection via a merchant device. That is, in some situations, the platform may facilitate the merchant selection of the two or more product items through a suitable merchant interface on the merchant device.

Some or all of the two or more products may be selected based on merchant or user input or selected by the platform automatically. In some cases, the platform may be configured with one or more settings associated with the merchant account to allow the merchant to specify constraints on kit contents. For example, the merchant account may have a set of configurable kit design parameters that constrain the platform in its product selections. Example kit design parameters might include a maximum number of product items per kit, exclusions of any specific product items or product categories from kits, restrictions on including items currently on sale, or other such constraints.

The platform may alternatively or additionally select items based on a selection model. In one example, the selection model may prescribe kits that contain varieties of the same type of product item, e.g. three different flavours of a foodstuff. In another example, the selection model may prescribe kits that contain product items with strong sale-sale correlation, i.e., that are commonly purchased together in the same order by a customer. In yet another example, the selection model may prescribe kits that contain a new product with an existing product. The existing product may be selected based on it being of the same product type or category. The existing product may be selected based on it being the best-selling product item of that product type or category.

The selection process may further be constrained by product-specific parameters or restrictions. For example, some products may be unsuitable for combined packaging and shipping with other products. Accordingly, product-specific shipping or packaging constraints may exclude certain products.

In operation 406, having selected the two or more products for inclusion in the kit, the platform then retrieves model data for the two or more products. It also retrieves packaging parameters. The packaging parameters retrieved may be based on one or more fulfillment centers associated with the merchant account. The model data may specify dimensions, weight and other physical parameters of the product items. Examples of other physical parameters may include, for example, container details, e.g. glass, plastic, metal, orientation restrictions, or fill requirements. The model data may include an image or images of the product item. The model data may include 3D model data for the product item.

The packaging parameters may specify dimensions, including interior dimensions, and other physical parameters of the packaging options. Examples of other physical parameters may include, for example, material details, e.g. cardboard weight, window placement, fill options, and/or lid/opening/flap function. The packaging parameters may include an image or images of the packaging. The model data may include 3D model data for the product item. The 3D model data may be configured to represent movable portions of the packaging, such as lid or other hinged portion.

In operation 408, a filtering operation may be applied to packaging parameters to exclude packaging options that are unworkable in view of the model data for the selected product items in the kit. In one example implementation, the filtering may be based on first determining a packaging arrangement of the two or more product items. The packaging arrangement may be partly determined based on dimensional data for the two or more product items. Other factors may be taken into account in determining the packaging arrangement of the two or more product items, such as any specified packaging restrictions associated with the two or more product items, e.g. minimum fill requirements, fill type requirements, or orientation requirements. The minimum fill requirements may specify, for example, that a product item requires at least one inch of fill material on all sides. The fill type requirements may mandate that a product item be packaged using solid foam fill, Styrofoam peanuts, or some other type or types of fill materials. The orientation requirements may indicate that a product item has a determined "right-side-up" orientation.

In some implementations, a display or arrangement restriction may be associated with the kit. For example, a merchant initiated kit design process may permit the merchant account to specify certain design parameters with regard to the kit, such as prescribed packaging arrangements. For instance, the prescribed packaging arrangement may mandate that each product be oriented facing outwards from the perspective of an open lid end of a container, and that the product items be arranged linearly such that a customer sees them aligned in a row when the container is opened. Other such configuration may be specified in prescribed packaging arrangements associated with the kit.

Subject to any prescribed packaging arrangements, the packaging arrangement may then be based on dimensional data for the product items and any minimum fill or orientation requirements associated with the product items. Based on these factors, the platform may determined minimum container dimensions. Using the minimum container dimensions, the filtering operation may exclude packaging options that cannot meet the minimum container dimensions.

In some cases, the platform may further determine maximum container dimensions. It will be appreciated that there are cost and environmental concerns with using over-sized packaging, including excess fill material and shipping expenses. Accordingly, having determined minimum container dimensions for the selected product items and the determined product arrangement, the platform may further determines maximum container dimensions, which in some implementations may be a multiple of the minimum container dimensions such as 1.25, 1.5 or 2.0 times the minimum dimensions. The filtering process may include excluding packaging options that exceed the maximum container dimensions.

The kit design process may also have associated with it one or more specified container types. The specified container types may be associated with the merchant account, in some cases, where the merchant specifies that its kits are to be created using a particular type of container, e.g. one or more specific form factors, such as boxes having certain cardboard weight, boxes having a full hinged lid, or boxes having a cellophane display window. The filtering operation may include excluding packaging options that do not meet the specified container types.

Provided the filtering does not result in a null set of packaging options or in a single remaining packaging option, the platform then has a resulting set of two or more packaging options. It then, in operation 410, selects one of the packaging options. In one example, the available packaging options may be sent to the merchant account for selection of a preferred option. In another example, the platform automatically selects one of the options. The selection may be based on one or more factors, including minimization of cost of packaging, minimization of shipping cost, minimization of size, correlation to packaging used in previously approved kits for the same merchant account, or other such factors. An optimization expression may be employed to select the packaging option. In one case, the one or more factors are used to generate a ranking of packaging options from most optimal to least optimal, and the options are transmitted to the merchant device for display together with associated information such as cost and images of the packaging options. A selection is then received by the platform from the merchant device.

Variations on the above are possible. For example, in some implementations the platform may be configured to identify a suitable packaging option directly based on the model data for the products selected and packaging parameters, if any, i.e. without any filtering. It will be appreciated that other variations are possible for identifying a suitable packaging option.

In operation 412, with a selected packaging option and its associated packaging parameters, and with the two or more selected product items, their associated model data, and any determined packaging arrangement, the platform then generates a product packaging model. The product packaging model may include a three-dimensional model that, at least, includes the dimensions of the selected packaging option, and the product arrangement and dimensions of the product items within that packaging option. The product packaging model may incorporate image data for the two or more product items. The product packaging model may be stored in any suitable three-dimensional computer modeling format, as noted above.

In operation 414, the generated product packaging model may then be transmitted to the merchant device associated with the merchant account. The product packaging model may be sent with associated metadata, including product item metrics, such as dimensions, historical sales and pricing data, and current inventory levels. At the merchant device, the product packaging model may be processed by suitable software (e.g. 3-D software) to render one or more views of the product packaging model for display on a display screen of the device.

Figure 5:
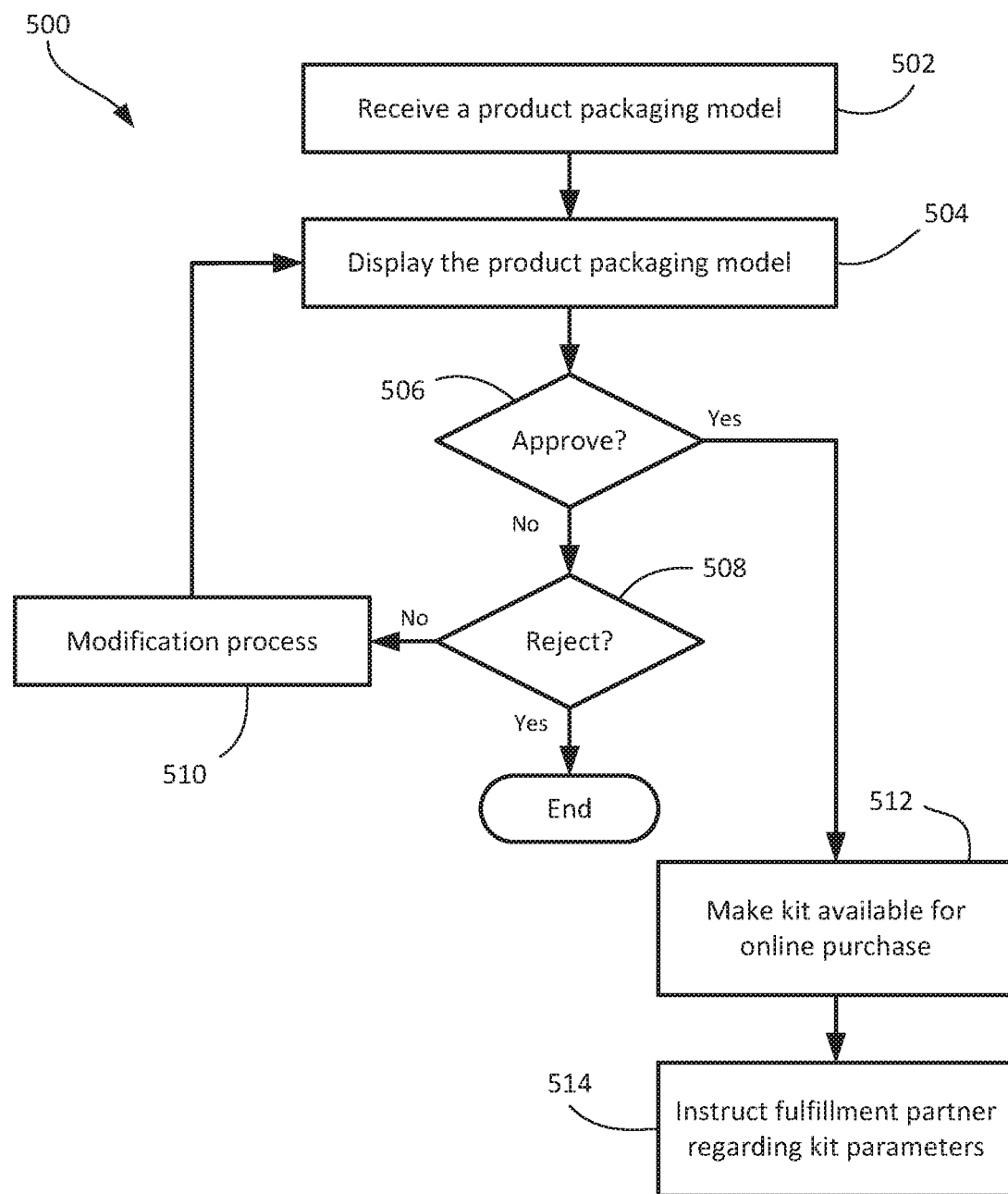
FIG. 5 shows, in flowchart form, one example method of generating a product packaging model.

Reference will now be made to FIG. 5, which shows, in flowchart form, one example method 500 of generating a product packaging model. The method 500 may be implemented at least in part on a merchant device, which may include a personal computer, a tablet, a smartphone, a laptop, a kiosk, and/or augmented reality glasses, in some implementations. The method 500 includes receiving the product packaging model from an e-commerce platform in operation 502. The product packaging model may be generated by the e-commerce platform as described above. In some instances, the product packaging model is generated at least partly automatically by the e-commerce platform and, in some cases, generation of the model is triggered by detection of an event or condition other than a merchant instructions. In such cases, the merchant device may further receive a notification or other message alerting the merchant account to the fact that the platform has generated a proposed kit and has created a product packaging model for the kit. The product packaging model may be received together with the notification, or may be automatically transmitted to the merchant device, or the merchant account may be prompted to log into the platform to receive the product packaging model.

The merchant device includes software configured to render the product packaging model (a 3-D computer model) for display on a display screen of the merchant device. In some cases, the display application may enable rotation, translation, and other model manipulation operations to enable the model to be viewed from a number of directions or view points. In some cases, the display application may enable functional operations with regard to the rendered packaging, such as display of the model in a "lid closed" and "lid opened" condition, where the lid opened condition permits viewing of the rendered interior of the packaged product revealing the two or more product items. The display application may permit the inclusion or exclusion of fill material from the display to enable clearer viewing of the two or more product items. The display application may enable cross-sectional views of the product packaging model. The range of operations and functions that may be incorporated into the display application for manipulating and displaying three-dimensional models will be appreciated by those ordinarily skilled in the art in light of the present description. The merchant device displays the product packaging model in operation 504.

The display application may, in some cases, be implemented as part of an e-commerce application associated with the e-commerce platform. In some cases, the e-commerce application may be a thin client application or browser-based application executing on the merchant device and some of the functions, such as three-dimensional model processing functions, may be carried out on a remote server. In some cases the remote server may include the e-commerce platform.

The e-commerce application may provide the merchant account with the ability to approve or disapprove of the proposed kit represented by the product packaging model. In some instances, the approval or disapproval may be transmitted from the merchant device to the e-commerce platform through selection of a link or icon in the e-commerce application or display application. In some cases, the approval or disapproval may be transmitted through logging into the merchant account on the e-commerce platform and selecting a displayed option from with a merchant account GUI. As indicated in operation 506, the method 500 may include transmitting approval of the kit to the e-commerce platform. If the kit is not approved, the method 500 include transmitting disapproval, as indicated by operation 508.

The e-commerce application or display application may further provide the merchant account with the ability to modify the product packaging model, as reflected by operation 510. The modification process may be implemented by software on the merchant device, software on the e-commerce platform, or in part by software on the merchant device and in part by software on the e-commerce platform. The modification process may provide for changes to the product packaging model, such as adjusting the position and/or orientation of the product items in the package, a change to labeling location or orientation, or a change to text printed on the labeling or packaging. Those changes may be reflected in modifications to the product packaging model itself. Such changes may be made, in some cases, at the merchant device through modifications to the product packaging model. A modified product packaging model may be transmitted to the e-commerce platform once the changes are confirmed on the merchant device.

In some instances, the modification process may include changes to the kit design or contents, such as a change to one or more of the product items, a change to the packaging option, a change in label size or imagery, or other such changes. These changes may include transmitting the altered parameters to the e-commerce platform where a new product packaging model is generated based on the original modeling data used subject to any altered parameters.

Once the product packaging model is approved in operation 506, a notification or message is received by the e-commerce platform which may then make the kit available via the merchant account's storefront in the online marketplace, as shown in operation 512. In some cases, approval notification may include approval or provision of a price level for the kit, images for display in the storefront relating to the kit, and/or prescribed return policy settings associated with the kit, as examples. In operation 514, the e-commerce platform may notify one or more fulfillment partners associated with the merchant account regarding the new kit design. The notification may include transmitting or making available the product packaging model to the fulfillment center. Use of the product packaging model during the fulfillment process is discussed further below.

Fulfillment Error Detection

As described above, in many situations a fulfillment partner may be relied upon to assemble and ship a kit containing two or more product items for a merchant. The assembly of a kit may be more involved than a typical pick-and-pack operation, since the merchant typically does not care what size or type of container is used in the pick-and-pack operation, or even whether items are shipped together or separately. With respect to a kit, however, the unitary kit and its contents are the ordered product and its correct assembly, arrangement and labelling is key to fulfilling the order and meeting merchant and/or buyer expectations.

The product packaging model discussed above may be leveraged to provide a mechanism to improve error detection in kit assembly. In some implementations, the mechanism may enable real-time error detection in kit assembly.

Figure 6:
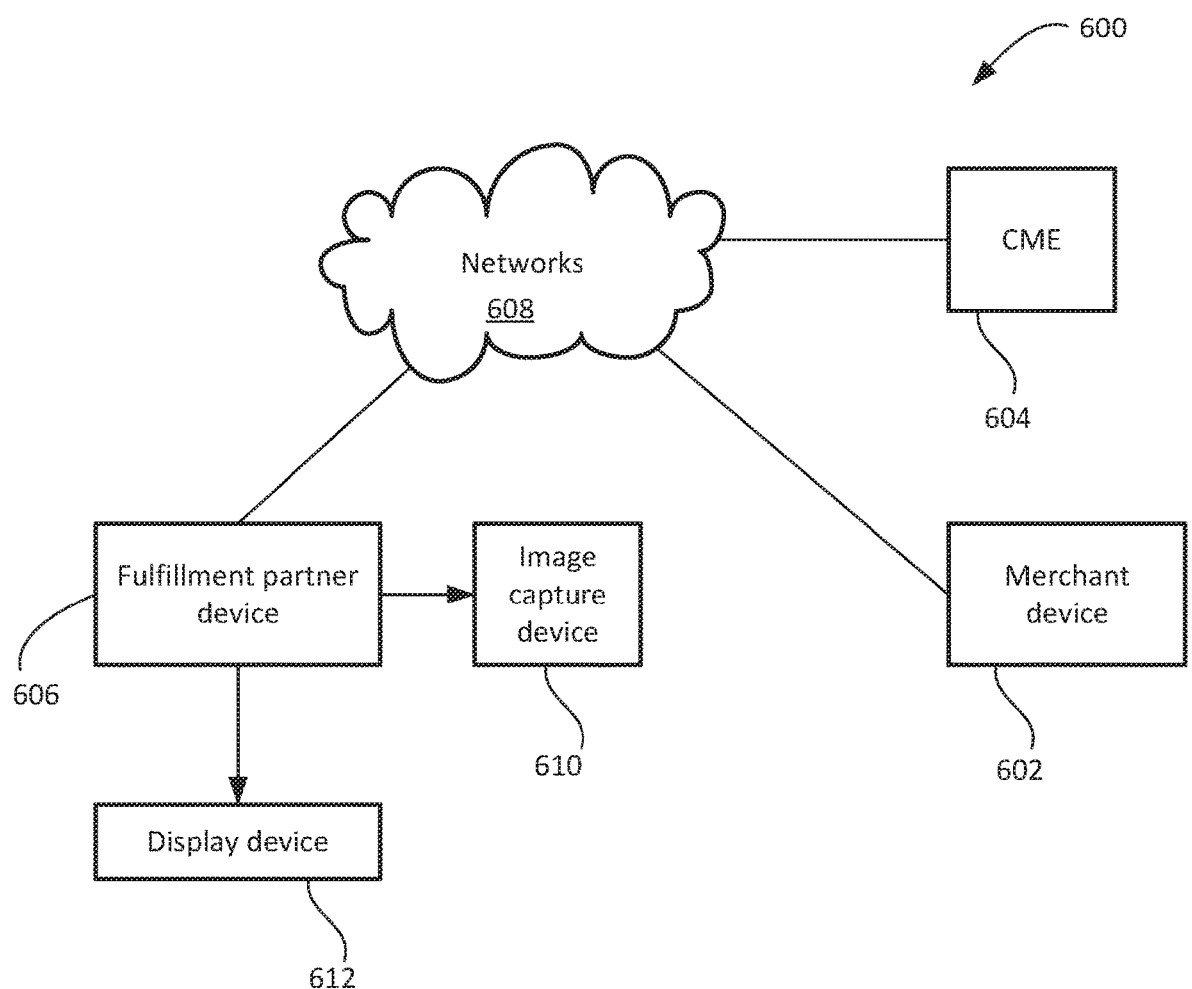
FIG. 6 shows a simplified diagram of a fulfillment error detection system.

Reference is now made to FIG. 6, which shows a simplified diagram of a fulfillment error detection system 600. The system 600 may include a merchant device 602, at least a portion of an e-commerce platform, such as a commerce management engine (CME) 604, and a fulfillment partner device 606, all coupled for electronic communication via one or more wired and/or wireless networks 608, such as the Internet and various wireless or wired local area networks, wireless wide area networks, virtual private networks, and the like.

The fulfillment partner device 606 may include an image capture device 610 and a display device 612.

A product packaging model may be transmitted from the CME 604 to the fulfillment partner device 606. The product packaging model may include details regarding a kit and the product items in the kit. The details may include identification of a specific packaging option, labelling instructions, printable label file(s), and/or a product arrangement plan for the kit. In some cases, the details may include fill options. In one example, the fill options may include a custom-cut fill specification detailing the custom cutting of foam or Styrofoam fill material to fit the product items and position them for display whilst within the packaging.

In some cases, the product packaging model transmitted to the fulfillment partner device 606 may include a 3-D model generated for the kit and/or images of the assembled kit based on the 3-D model generated. The images may be rendered views of the 3D model from various perspectives. In some cases the transmissions further provides the 3D model files, thereby providing the 3D computer model itself. The fulfillment partner device 606 may include suitable display software to enable display and manipulation of the model on the display device 612.

In some cases, the fulfillment partner device may be a desktop or personal computer with an attached monitor or monitors. In some cases, the fulfillment partner device may be a mobile device, such as a tablet, smartphone, or wearable device. An example of a wearable device is augmented reality (AR) glasses such as Google™ Glass, or similar such devices. With a mobile device, the fulfillment partner operator may position the device such that the device camera is aimed at the packaged product as assembled. This enables capture of images or video relating to the packaged product during or just after assembly of the packaged product. In some cases, the mobile device, whether a wearable or a tablet or smartphone, may enable augmented reality views of the packaged product in which images of the packaged product are output to the display device 612 from the image capture device 610 and those images are overlaid on the display with data derived from the packaged product model.

In one example, the overlaid data may include data regarding the contents of the kit, the product items, their arrangement, and/or labelling requirements, as examples. In some implementations, the overlaid data may include one or more images derived from the product packaging model. In some implementations, the images may include at least one view rendered of the 3D product packaging model. In such an implementation, the fulfillment partner device 606 may be configured to identify one or more image features of the assembled packaged product and to detect registration of the model with the image features in the camera view. Prompts to encourage alignment of the camera view to register with the rendered 3D view of the model may be output to the display device 612 until registration is achieved. Registration may then result in capture of one or more images of the assembled product and further image feature analysis to determine whether the image features detected within the captured image(s) match expected image features based on the product packaging model. Example image features may include identity of the product items, arrangement of the product items, type and dimensions of packaging, fill type and quantity, labelling, and other features. Deviations may be signaled on the display device 612 and/or may be output as a message to a third party. For example, the message may be transmitted to an associated merchant account or merchant device. In some cases, the message may include the one or more images captured of the assembled product.

Accordingly the product packaging model may be used in combination with the fulfillment partner device 606 to automatically confirm correct assembly of a kit and provide a notification to the fulfillment partner and/or an associated merchant, or to detect deviations in the assembled kit from the product packaging model and to provide an error notification to the fulfillment partner and/or an associated merchant. This aid in automatically detecting errors in kit assembly at the fulfillment phase may reduce errors, returns, and shipping costs and time.

Figure 7:
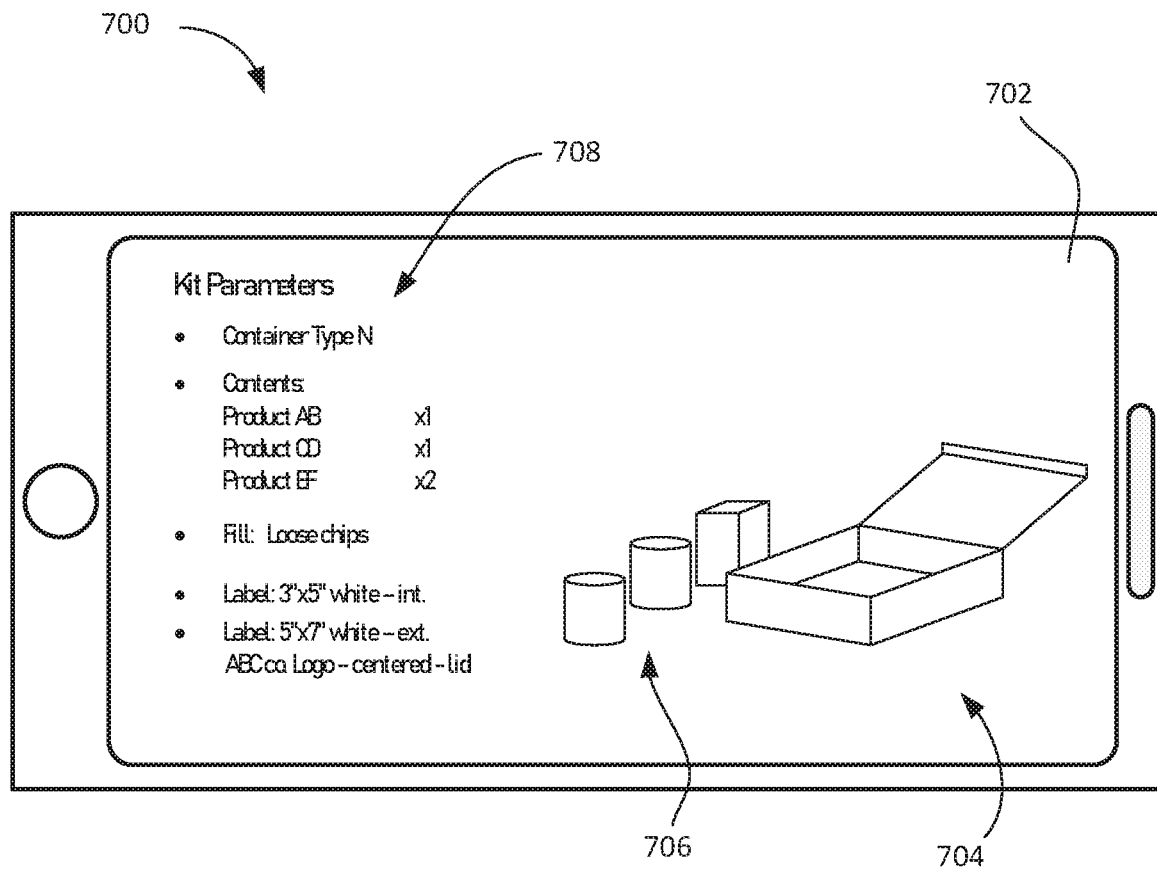
FIG. 7 diagrammatically illustrates an example mobile device that may be used in by a fulfillment partner during a fulfillment phase.

FIG. 7 diagrammatically illustrates an example mobile device 700 having a display screen 702 that may be used in by a fulfillment partner during a fulfillment phase. Although the depicted mobile device 700 is in the form factor of a smartphone, it will be appreciated that it may be implemented using a tablet, AR glasses, other wearable device, or other mobile device. In some instances, the device may be a non-mobile device having its camera positioned so as to view an assembly area or table and having a display screen visible to an operator.

The mobile device 700 in this example includes one or more cameras (not shown). For example, a camera may located on the backside of the mobile device 700. The mobile device 700 may include a processor, memory, communications subsystems, and other common components to mobile computing devices. The mobile device 700 may have stored thereon software (e.g. a fulfillment application) executable by the processor to put the camera into a viewfinder mode in which captured live-view images from the camera are output to the display screen 702. In this regard, the camera live view may be aimed at, and focused upon, a kit assembly area. In this illustration, the live view from the camera shows a packaging container 704, and two or more product items 706, with the kit in an unassembled state. The fulfillment application may further cause the display screen 702 to display overlay data 708 derived from the product packaging model. The overlay data 708 may include data regarding the type and/or size of package container, details regarding the product items to be placed in the container, detail regarding the fill type or quantity, detail regarding label contents, size or positioning, or any other details to guide correct assembly of the kit.

In some implementations, the overlay data 708 may operate as a checklist, with items displayed with an empty checkbox or displayed in red text or otherwise visually indicated as being not completed. The display screen 702 may, in some cases, be a touchscreen and the mobile device 700 may be configured to alter the displayed complete status of items in response to a touch input detected in associated with the item. For example, the operator may touch an item to cause it to be displayed as completed, e.g. with a marked checkbox, or in green text, or the like.

In some other embodiments, the fulfillment application may conduct image feature detection with respect to one or more images captured by the camera. The image feature analysis may be configured to detect features that match the items in the overlay data 708. For example, the image feature analysis may detect the packaging container 704 and the one or more product items 706 and based on a comparison with expected feature data from the product packaging model, may determine that one or more of the overlay items is present in the image and, accordingly, may visually indicate on the display that the item is complete. In some cases, the feature detection may be based on detecting a barcode, QR code, or other item identifier, on the item in the image.

Figure 8:
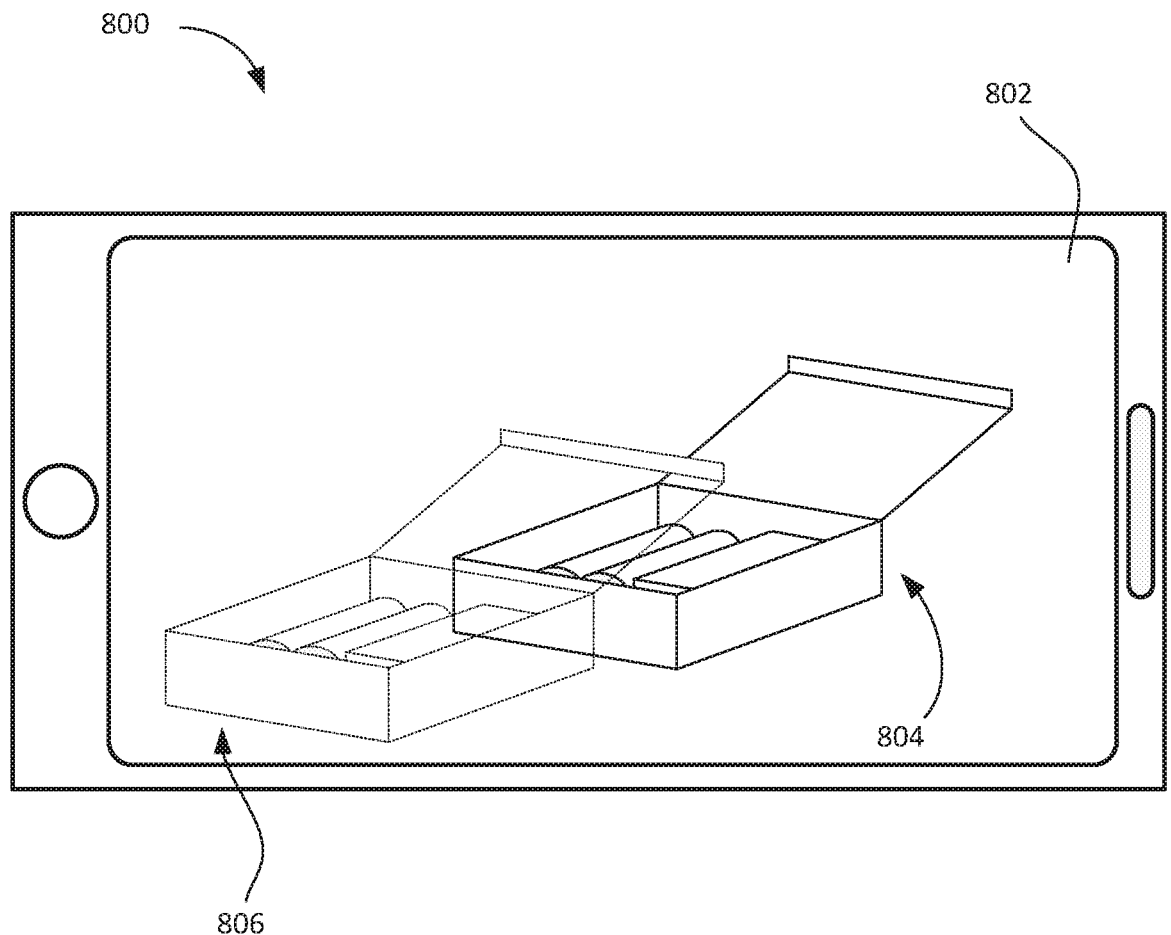
FIG. 8 shows another example mobile device.

Reference is now made to FIG. 8, which shows another example mobile device 800. The mobile device 800 includes a display screen 802. Although illustrated as a smartphone in this example, the mobile device 800 may be implemented using a tablet, AR glasses, other wearable, or other mobile computing device.

In this example, the mobile device 800 displays live view images captured by the camera in a viewfinder mode. The live view images may show an assembled packaged product or kit 804.

The mobile device 800 may include software (e.g. a fulfillment application) that, when executed by a processor, causes the processor to load a product packaging model and render a view 806 of the product packaging model on the display screen 802 as an overlay to the live view. The rendered view 806 may present one perspective view of the product packaging model. In some implementations, the fulfillment application may enable rotation, translation or other manipulations of the rendered product packaging model.

The view 806 of the product packaging model may be rendered in a semi-transparent state to enable partially-obscured viewing of camera captured images. In some implementations, the view 806 may be rendered in a "ghost" mode in which features of the model are rendered in at least partly transparent shades of grey to white. In some implementations, the view 806 rendered may include rendering edges of the model and not solid surfaces. The edges may be rendered in stippled lines, semi-transparent lines, solid lines, or in another manner. It will be appreciated, that the rendering of the view 806 of the model is sufficiently transparent that a user of the mobile device 800 is capable of moving the mobile device 800 so as to align the image of the assembled kit 804 with the view 806 of the product packaging model.

The fulfillment application may include a registration module for detecting registration between the view of the assembled kit and the product packaging model. For example, the registration module may include an edge detection module and/or other image feature detection modules capable of analysing images of the assembled kit captured by the camera in the viewfinder mode. The fulfillment application compares detected image features with the features of the rendered model to detect alignment of, for example, edges and/or vertices of the container. Alignment may be detected within a set permissible tolerance.

The fulfillment application may be configured to provide visual cues or guidance on the display screen 802 to aid in proper registration. For example, vertices of the model may be emphasized to promote alignment of those with the vertices of the assembled kit. Colour may be used to prompt proper alignment. For example, lines of the model may be rendered in red when unaligned and may be shown in green once aligned. The colour may transition to green gradually as the model is brought into closer alignment with the view of the assembled kit.

Once registration is detected, then the fulfillment application may cause the camera to capture an image of the assembled kit. The fulfillment application may then carry out more robust image feature detection with respect to the captured image or images. Those detected image features may be compared to prescribed features derived from the product packaging model, for example, to detect the type and size of the packaging container, to detect the identity of the product items in the container, to detect the arrangement and orientation of the product items, to detect the fill type or quantity, and/or to detect the labeling contents and positioning, as examples.

The fulfillment application may be configured to output a success notification in response to detection of all prescribed features and/or to output an error notification in response to detection of a deviation in features, such as a prescribed feature that is undetected and/or a detected feature that is not prescribed, e.g. the presence of an additional product item or fill type or other feature.

The notification may be output to the display screen 802. In some implementations, the notification may be transmitted to a remote device, such as a merchant device. The notification may include one or more captured images of the assembled kit. In some cases, the notification may indicate the deviation detected, i.e. a missing items, incorrect item, additional item, misalignment of items, or other errors in assembly.

The registration, image capture, and feature detection process may be repeated for more than one view of the kit. For example, the process may be applied to the kit with the lid open showing the contents, and then repeated for a view of the kit with the lid closed and labelling applied.

Figure 9:
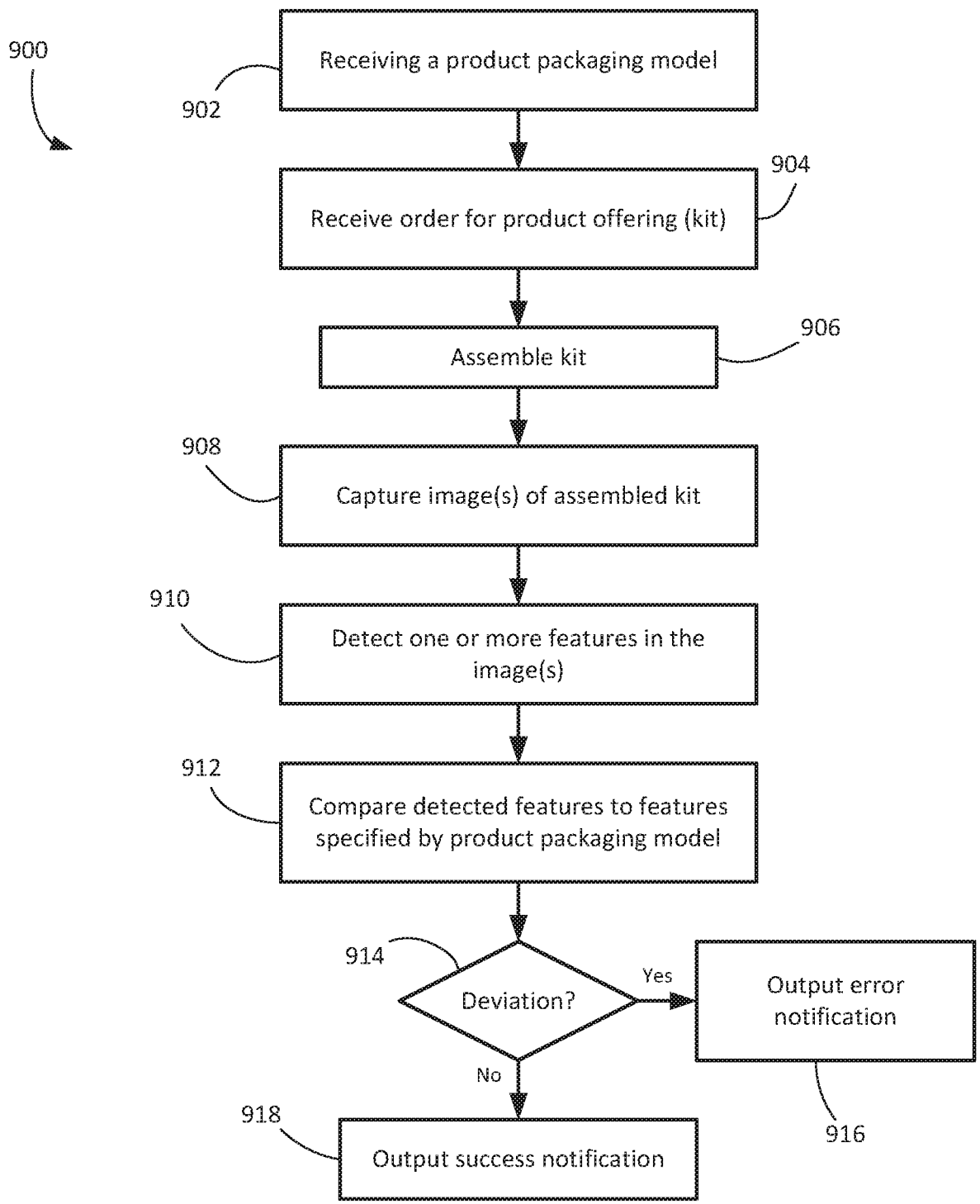
FIG. 9 shows, in flowchart form, an example method of detecting errors in kit assembly.

An example method 900 of detecting errors in kit assembly is shown in flowchart form in FIG. 9. The method 900 may by at least partly implemented by a fulfillment partner device, which in many embodiments may include a mobile device. In some implementations, the mobile device includes a fulfillment application and/or other software containing processor-executable instructions that, when executed by one or more processors in the mobile device, cause the mobile device to carry out the described operations. The mobile device includes at least a display screen and an image capture device.

The method 900 includes receiving the product packaging model in operation 902. This may include receiving a three-dimensional model file, receiving images of the model, receiving metadata regarding the kit and its contents and arrangement, or combinations thereof. The product packaging model may be received from an e-commerce platform and may be associated with a specific merchant account.

In operation 904, the fulfillment partner device receives an order relating to the kit associated with the product packaging model, and in operation 906, the kit is assembled. In some embodiments, operation 906 is optional an could be performed by a robot or robots based on the product packaging model or by a human manually retrieving a packaging container, product items, fill materials, and labels, and assembling them to produce the kit.

In operation 908, using the mobile device, one or more images are captured of the assembled kit. The images may be captured using a camera on the mobile device. As described above, the images may be automatically captured based on detecting registration of a view of the assembled kit in a camera viewfinder mode with a displayed overlay of the product packaging model. In some cases, the image or images are captured automatically based on image feature detection relating to the assembled kit when viewed in a camera viewfinder mode. In some cases, the image or images are manually captured through user-initiated image capture using the mobile device.

In operation 910, the mobile device detects features in the one or more images. The detected features may be identified using image processing algorithms, including edge detection, scale-invariant feature transform (SIFT), thresholding, Hough transform, or other such techniques. Machine learning may be employed to train a feature detection module, and the feature detection module trained using a set of training data may be deployed to fulfillment partner devices through the fulfillment application software. In some cases, the feature identification may be carried out remotely. In such cases, the mobile device may transmit the one or more images to a remote server, such as a server within the e-commerce platform, and the image feature detection may be carried out by that server, with results transmitted back to the mobile device.

The detected features may be compared to features prescribed in the product packaging model in operation 912. For example, the product packaging model may define a packaging container having certain relative dimensions and the mobile device may determine whether the detected features indicate that the image of the kit includes a container having the same (within a certain degree of tolerance) relative dimensions. As another example, the product packaging model may prescribe a product item on the left side of the container having a certain image on its label. The mobile device may determine whether the detected features include a matching image in the correct location to indicate proper placement and orientation of the prescribed product item.

The mobile device may then assess whether there is a deviation between the prescribed features and the detected features in operation 914. A deviation may include a detected feature that is not prescribed that correlates to a packaging error. For example, the detected feature may correlate to the presence of an extra product item or other item in the container. As another example, the detected feature may correlate to a label or image on the container or on one or more product items that is not among prescribed labels or images. A deviation may also include a prescribed feature that is not detected in the image(s). For example, one of the prescribed product items may not be detected in the image(s). A deviation may also include a difference between a detected feature and a prescribed feature. This may include a different in size, a difference in position/orientation, a difference in an image, or other such differences that may be indicative of an error in the kit assembly.

In operation 916, if a deviation was detected, then an error notification may be output. The error notification may be output on the mobile device. It may be alternative or additionally transmitted to a remote device, such as the e-commerce platform and/or a merchant device related to an associated merchant account. The error notification may indicate the deviation and/or the feature involved. The error notification may visually indicate the deviation on the captured image in some cases, such as highlighting, colouring, or otherwise indicating the location in the image of the deviation. The error notification may include a text notification, image notification, auditory alert, vibratory alert, other type of notification, or combinations thereof.

If no deviation is detected, then in operation 918 the mobile device outputs a success notification. The success notification may be output on the mobile device. It may be alternatively or additionally transmitted to a remote device, such as the e-commerce platform and/or a merchant device related to an associated merchant account. The success notification may include a text notification, image notification, auditory alert, vibratory alert, other type of notification, or combinations thereof.

Figure 10:
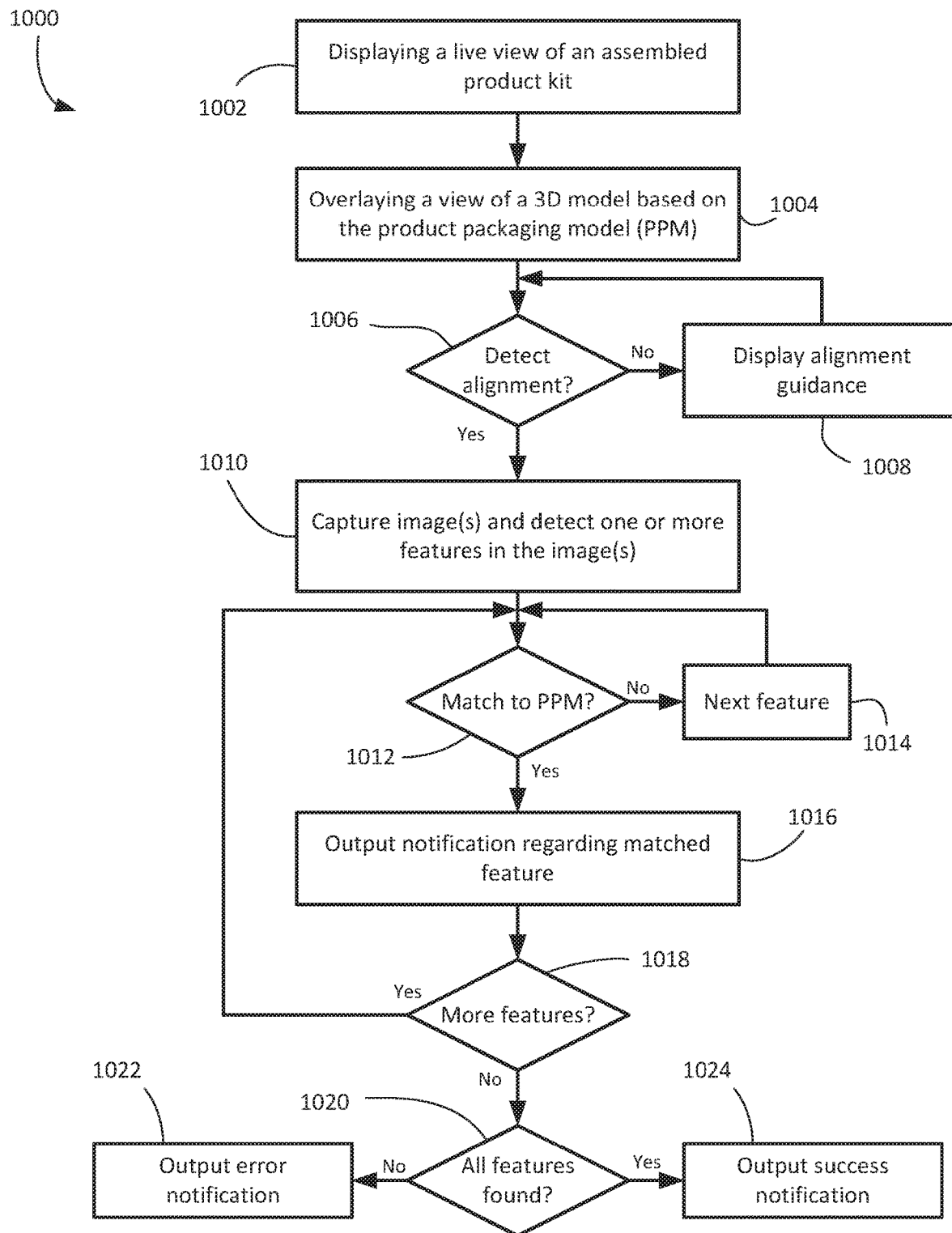
FIG. 10 shows another example method for detecting errors in kit assembly.

Reference is now made to FIG. 10, which shows, in flowchart form, an example method 1000 for detecting errors in kit assembly. The method 1000 may by at least partly implemented by a fulfillment partner device, which in many embodiments may include a mobile device. In some implementations, the mobile device includes a fulfillment application and/or other software containing processor-executable instructions that, when executed by one or more processors in the mobile device, cause the mobile device to carry out the described operations. The mobile device includes at least a display screen and an image capture device.

In operation 1002, using the mobile device, live view images/video are captured of the assembled kit. The video may be captured using a camera on the mobile device operating in a viewfinder mode. In some cases, such as with AR glasses, the live view may be captured without being displayed on the basis that the wearer is viewing the same captured view via the glasses live in real-time.

In this example, the mobile device also displays an overlay view of the three-dimensional product packaging model on the display screen. With a smartphone or tablet, this may include overlaying the view atop the displayed camera live view. With AR glasses or the like this may include displaying the view on a semi-transparent screen that makes up the glasses, or layering the view atop reality by projecting the view directly into the wearer's eye via a semi-transparent prism, like with Google™ Glass™.

In operation 1006, the mobile device determines whether the live view images/video show an assembled kit that is sufficiently aligned in orientation with the displayed overlay view of the three-dimensional product packaging model. This may include performing fast feature detection using image processing techniques like edge detection, SIFT, or the like, to quickly identify, for example, boundary edges of the packaging container in the video image(s), and to compare those detected features with the corresponding features of the product packaging module. When the features, or a subset of those features, are aligned within a threshold degree of tolerance, then the mobile device may determine that the assembled kit and the model view are sufficiently aligned. If not, then, in some cases, the mobile device may display prompts or other visual cues to assist in alignment, as indicated by operation 1008.

Detection of orientation alignment may then trigger capture of an image of the aligned assembled kit in operation 1010. The image may be obtained as a frame of the captured video in some embodiments. The image may be captured as a higher-resolution image than is available in the viewfinder mode, in some embodiments.

Operation 1010 may further involve performing feature detection with respect to the image to identify features in the image. The detected features may be identified using image processing algorithms, including edge detection, SIFT, thresholding, Hough transform, or other such techniques. Machine learning may be employed to train a feature detection module, and the feature detection module trained using a set of training data may be deployed to fulfillment partner devices through the fulfillment application software. In some cases, the feature identification may be carried out remotely. In such cases, the mobile device may transmit the one or more images to a remote server, such as a server within the e-commerce platform, and the image feature detection may be carried out by that server, with results transmitted back to the mobile device.

Having identified image features, the mobile device may then compare the detected features and the prescribed features from the product packaging model. In operation 1012, for example, the mobile device may compare a detected feature to the product packaging model to determine whether it matches a product packaging model prescribed feature. If the detected feature is not found, then the deviation may be noted in operation 1014 and the mobile device may move to the next detected feature and return to operation 1012 to assess whether it matches a prescribed feature.

If the detected feature is matched to a prescribed feature, then in operation 1016 the mobile device may output a notification regarding the detected feature. For example, the mobile device may output an audio alert, e.g. as success sound, and/or may provide a visual indication on the display screen. The visual indication may be displayed in association with the detected feature. For example, the image of the assembled kit may be displayed with the detected feature that was matched highlighted, coloured green, or otherwise indicated as having been matched. The mobile device then assesses whether there are more detected features to evaluate in operation 1018 and, if so, the method 1000 returns to operation 1012. If not, then the method 1000 continues with operation 1020 to assess whether all prescribed features were found in the detected features.

If all prescribed features were found, then a success notification may be output in operation 1024. If they were not all found, then a notification may by output regarding the missing features in operation 1022. In some cases, operation 1022 may also be carried out if detected features were noted in operation 1014 that could not be matched to a prescribed feature. The notifications may be output on the mobile device in some embodiments. They may alternatively or additionally be transmitted to a remote device, such as the e-commerce platform and/or a merchant device related to an associated merchant account. The notifications may include a text notification, image notification, auditory alert, vibratory alert, other type of notification, or combinations thereof.

In some instances, the operations of FIG. 10 may be repeated for two or more orientations or viewpoints of the assembled kit. The orientations may, in one example, include the kit in two states, e.g. packaging open and packaging closed. In different orientations or viewpoints may have different associated features. For example, certain features may be associated with an orientation that are not necessarily visible in another orientation. Accordingly, in some implementations, the notifications of operations 1022 and/or 1024 may be output after the operations are repeated for each of the prescribed orientations or viewpoints.

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method for packaging a product offering of product items associated with a merchant account, the method comprising:
   storing, in memory, a product packaging model associated with a kit for a merchant account, the product packaging model including parameters for two or more product items in the kit and a selected packaging option;
   receiving one or more images of a kit during an assembly operation;
   rendering the one or more images on a fulfillment partner device;
   displaying an overlay on the one or more images on the fulfillment partner device, wherein the overlay includes data from the product packaging model;
   detecting image features in the one or more images;
   comparing the detected image features to the product packaging model and, based on the comparison, detecting a deviation; and
   outputting a notification regarding the detected deviation.

2. The computer-implemented method of claim 1, wherein the overlay includes a view of a three-dimensional model overlaid on the one or more images on the fulfillment partner device, wherein the three-dimensional model is rendered from the product packaging model.

3. The computer-implemented method of claim 2, further comprising detecting registration of the three-dimensional model with a view of the kit in the one or more images and, in response, capturing an image and detecting the image features in the captured image.

4. The computer-implemented method of claim 1, wherein detecting image features include processing the one or more images using one or more of edge detection, scale-invariant feature transform, thresholding, or Hough transform.

5. The computer-implemented method of claim 1, wherein detecting a deviation includes comparing each of the detected image features to the parameters prescribed by the product packaging model and identifying that one of the detected image features is not included in the product packaging model.

6. The computer-implemented method of claim 1, wherein detecting a deviation includes comparing each of the detected image features to the parameters prescribed by the product packaging model and identifying that one of the parameters in the product packaging model is not found in the detected image features.

7. The computer-implemented method of claim 1, wherein detecting a deviation includes comparing each of the detected image features to the parameters prescribed by the product packaging model and determining that one of the detected image features deviates from its corresponding parameter in the product packaging model by more than a threshold amount.

8. The computer-implemented method of claim 1, wherein outputting a notification include displaying the notification on the fulfillment partner device displaying at least one of the one or more images, and wherein the notification includes a visual indicator of the detected deviation.

9. The computer-implemented method of claim 1, wherein outputting a notification includes transmitting a notification message to a device associated with the merchant account regarding the detected deviation.

10. The method claimed in claim 1, wherein rendering includes operating a camera of the fulfilment partner device in a viewfinder mode and displaying the one or more images from the camera in the viewfinder mode.

11. A fulfillment partner device for packaging a product offering of product items associated with a merchant account, the fulfillment partner device comprising:
    memory storing a product packaging model associated with a kit for a merchant account, the product packaging model including parameters for two or more product items in the kit and a selected packaging option;
    a display screen;
    a processor; and
    a storage media storing computer-executable instructions that, when executed by the processor, are to cause the processor to:
        receive one or more images of a kit during an assembly operation;
        render the one or more images on the display screen;
        display an overlay on the one or more images, wherein the overlay includes data from the product packaging model;
        detect image features in the one or more images;
        compare the detected image features to the product packaging model and, based on the comparison, detecting a deviation; and
        output a notification regarding the detected deviation.

12. The fulfillment partner device of claim 11, wherein the overlay includes a view of a three-dimensional model overlaid on the one or more images on the fulfillment partner device, wherein the three-dimensional model is rendered from the product packaging model.

13. The fulfillment partner device of claim 12, wherein the instructions, when executed, are to further cause the processor to detect registration of the three-dimensional model with a view of the kit in the one or more images and, in response, capture an image and detect the image features in the captured image.

14. The fulfillment partner device of claim 11, wherein the instructions, when executed, are to cause the processor to detect image features by processing the one or more images using one or more of edge detection, scale-invariant feature transform, thresholding, or Hough transform.

15. The fulfillment partner device of claim 11, wherein the instructions, when executed, are to cause the processor to detect a deviation by comparing each of the detected image features to the parameters prescribed by the product packaging model and identifying that one of the detected image features is not included in the product packaging model.

16. The fulfillment partner device of claim 11, wherein the instructions, when executed, are to cause the processor to detect a deviation by comparing each of the detected image features to the parameters prescribed by the product packaging model and identifying that one of the parameters in the product packaging model is not found in the detected image features.

17. The fulfillment partner device of claim 11, wherein the instructions, when executed, are to cause the processor to detect a deviation by comparing each of the detected image features to the parameters prescribed by the product packaging model and determining that one of the detected image features deviates from its corresponding parameter in the product packaging model by more than a threshold amount.

18. The fulfillment partner device of claim 11, wherein the instructions, when executed, are to cause the processor to output a notification by displaying the notification on the display screen, and wherein the notification includes a visual indicator of the detected deviation.

19. The fulfillment partner device of claim 11, wherein the instructions, when executed, are to cause the processor to output a notification by transmitting a notification message to a device associated with the merchant account regarding the detected deviation.

20. A non-transitory computer-readable medium storing processor-executable instructions for packaging a product offering of product items associated with a merchant account, wherein the instructions, when executed by one or more processors, are to cause the one or more processors to:
    store, in memory, a product packaging model associated with a kit for a merchant account, the product packaging model including parameters for two or more product items in the kit and a selected packaging option;
    receive one or more images of a kit during an assembly operation;
    render the one or more images on a fulfillment partner device;
    display an overlay on the one or more images on the fulfillment partner device, wherein the overlay includes data from the product packaging model;
    detect image features in the one or more images;
    compare the detected image features to the product packaging model and, based on the comparison, detect a deviation; and
    output a notification regarding the detected deviation.

21. The method claimed in claim 10, wherein displaying the overlay includes displaying an image of a view of the product packaging model in one of a semi-transparent state or as one or more edges of the product packaging model.

22. The method claimed in claim 21, wherein displaying the overlay includes displaying one or more prompts to guide movement of the fulfilment partner device to align the images of the kit in the viewfinder mode with the displayed view of the product packaging model.

23. The method claimed in claim 22, further comprising detecting registration between the kit and the displayed view of the product packaging model and, in response, capturing an image and detecting the image features in the captured image.

* * * * *